United States Patent [19]  [11]  4,206,871
Nilsson  [45]  Jun. 10, 1980

[54] LEAKAGE INDICATOR FOR CENTRIFUGE

[75] Inventor: Vilgot R. Nilsson, Hagersten, Sweden

[73] Assignee: Alfa-Laval AB, Tumba, Sweden

[21] Appl. No.: 945,639

[22] Filed: Sep. 25, 1978

[30] Foreign Application Priority Data

Dec. 28, 1977 [SE] Sweden ............................ 7714810

[51] Int. Cl.$^2$ .......................... B04B 1/14; G08B 21/00
[52] U.S. Cl. ................................... 233/19 R; 340/605
[58] Field of Search ...................... 233/19 R, 1 R, 1 B, 233/24, 1 C, 20 R, 20 A; 210/90, 144; 340/605, 608, 683

[56]  References Cited
U.S. PATENT DOCUMENTS

| 2,698,929 | 1/1955 | Greacen et al. | 340/608 |
| 3,648,926 | 3/1972 | Pause | 233/20 A |
| 3,701,469 | 10/1972 | Nilsson | 233/20 A |
| 4,099,667 | 7/1978 | Uchida | 233/24 |
| 4,128,831 | 12/1978 | Rensch | 340/605 |
| 4,133,016 | 1/1979 | Tanguy | 340/605 |

Primary Examiner—George H. Krizmanich
Attorney, Agent, or Firm—Cyrus S. Hapgood

[57]  ABSTRACT

In a centrifuge having a rotor from which solid material is discharged intermittently through a peripheral discharge opening, leakage through the opening is detected by a device comprising vibration-sensing means positioned radially outside the opening so that liquid leaking therethrough strikes such means during operation of the centrifuge, the sensing means including means for emitting a signal in response to impact of liquid thereon.

4 Claims, 2 Drawing Figures

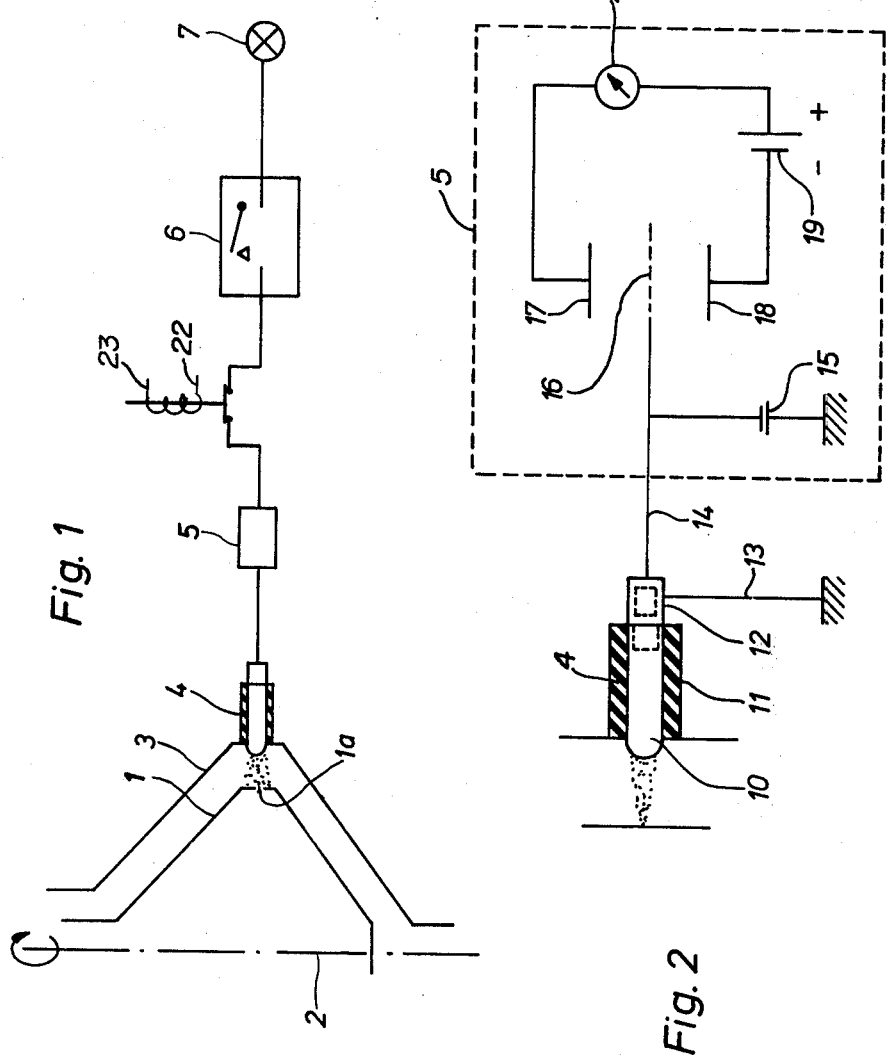

LEAKAGE INDICATOR FOR CENTRIFUGE

THE DISCLOSURE

This invention relates to centrifuges from which solid material is discharged intermittently in the operation of the centrifuge.

In centrifugal separators of the above kind, the solid material is discharged through one or more discharge openings located at the periphery of the rotor. The solid material collects at the radially outermost parts of the rotor, due to the centrifugal forces, and is discharged through the outlet openings which are opened periodically. After each opening, the discharge openings are closed again by bringing coacting sealing surfaces into contact with each other, one of these surfaces being provided with an elastic sealing ring.

In the event that the sealing ring becomes damaged or worn, liquid may leak out of the rotor through the discharge opening during the periods between solids discharging operations. Such leakage is undesirable, since it means a loss of the liquid product being treated in the centrifuge. Centrifuges now are often employed in automated processes in which manual supervision is reduced to a minimum, and therefore it would be desirable to provide automatic detection of such leakage.

It has been proposed to detect leakage using an acoustic supervisory arrangement which senses the change in noise level caused by the leaking liquid. However, this method has proved relatively expensive and does not provide adequate sensitivity for indicating small leaks.

It has also been proposed to use a flow-sensing arrangement for indicating the leakage. Such an arrangement must be located in the solids discharge opening of the machine, and it has been found that it does not work satisfactorily because its continued operation is disturbed through clogging with slurry.

According to the present invention, there is provided a device for detecting leakage from the roter of a centrifuge, from which rotor solid material is discharged intermittently through one or more discharge openings, the device comprising mechanical vibration-sensing means mounted radially outside the discharge opening, whereby liquid leaking through the opening is thrown from the rotor towards solid means, during operation of the centrifuge, the sensing means being arranged to emit a signal in response to impact of liquid thereon.

The invention also provides a centrifuge having such a leakage detecting device.

In the operation of the centrifuge, any leaking liquid or suspension is thrown off by the rotor of the centrifuge at high speed and has high kinetic energy. The drops thrown from the rotor impinge against the vibration sensor which responds by emitting signals to indicate that leakage has occurred. Even relatively small leaks can be detected.

A preferred embodiment of the invention will now be described by way of example with reference to the accompanying drawing, in which:

FIG. 1 is a diagrammatic cross-sectional view through part of a centrifuge provided with a device embodying the invention, and FIG. 2 is a diagrammatic view, on an enlarged scale, of part of the arrangement shown in FIG. 1.

In FIG. 1, the centrifuge as illustrated comprises a rotor 1 rotatable about an axis 2 within a stationary housing or casing 3 which serves to collect slurry discharged intermittently through a discharge outlet 1a at the periphery of the rotor 1. A mechanical vibration-sensitive member 4 is mounted on the casing 3 radially outside the slurry discharge opening 1a in the rotor 1, so that drops of liquid leaking from the rotor are thrown towards the member 4 as the rotor rotates. The member 4 is connected electrically to an amplifier 5, a signal processing unit 6 including a relay and a transformer, and an indicator lamp 7. The components 4 through 7 are known per se.

The components 4 and 5 are shown in greater detail in FIG. 2. The sensor 4 comprises a receiver rod 10 which is surrounded by a so-called acoustic insulation 11, and a mechanical vibration-sensitive element 12 which contains a piezoelectric crystal. The element 12 is earthed or grounded on one side by a lead 13 and is connected on the other side to the amplifier 5 by a lead 14 which is grounded through a capacitor 15. The amplifier 5 is provided in known manner with a grid 16 located between electrodes 17 and 18 which are connected to a circuit which includes a power source of current 19 and an ammeter 20.

As illustrated schematically in the drawing, drops of liquid leaking from the rotor 1 are thrown against the rod 10 of the vibration sensor 4. The drops are thrown from the rotor at high speed and consequently have a relatively high energy which upon impact with the rod 10 is lost. The impact energy of the drops is transmitted along the rod 10 to the element 12 and sets the piezoelectric crystal into oscillation. Consequently, the crystal emits an electrical signal which is amplified by the amplifier 5. The amplified signal closes the relay in the unit 6 so that the lamp 7 is illuminated to indicate that leakage has occurred. If desired an audible alarm device (not shown) may be actuated at the same time. It is even possible to pass the signal to a relay (not shown) which stops the centrifuge automatically if a leak is detected.

The circuit is preferably so arranged that the lamp 7 remains illuminated until a manual reset operation is performed; that is, the lamp stays on even though the leakage may have stopped.

During normal slurry discharge periods, the device is switched off by suitable means, such as a switch 22 for automatically opening the connection between amplifier 5 and unit 6 during those periods. Of course, various means may be provided for opening switch 22 in response to intermittent opening of outlet 1a for discharge of solid material. A conventional means includes a solenoid 23 connected in a circuit (not shown) which is energized while outlet 1a is open, thereby opening switch 22, the latter reclosing by gravity when solenoid 23 is deenergized in response to closing of outlet 1a.

I claim:

1. In combination with a centrifuge including a rotor having a discharge opening through which solid material is discharged intermittently from the rotor, a device for detecting leakage from the rotor and comprising vibration-sensing means mounted radially outside the discharge opening in a position such that liquid leaking through the opening is thrown from the rotor towards said means, during operation of the centrifuge, the sensing means including means for emitting a signal in response to impact of liquid thereon.

2. A device according to claim 1, wherein the signal is an electrical signal.

3. A device according to claim 2, wherein the vibration-sensing means comprises a piezoelectric crystal.

4. A device according to claim 1, comprising also means for rendering said detecting device inoperative in response to intermittent discharge of solid material through said discharge opening.